United States Patent [19]

Waite

[11] Patent Number: 4,688,810
[45] Date of Patent: Aug. 25, 1987

[54] SUPPORT FOR A CHUCK

[75] Inventor: Carlson A. Waite, Traverse City, Mich.

[73] Assignee: Sheffer Collet Company, Traverse City, Mich.

[21] Appl. No.: 850,556

[22] Filed: Apr. 15, 1986

[51] Int. Cl.⁴ .............................................. B23B 31/16
[52] U.S. Cl. .................... 279/1 A; 279/71; 279/81; 279/110
[58] Field of Search ............ 279/1 R, 1 A, 1 D, 279/1 L, 1 DA, 1 ME, 2 R, 35, 36, 71, 81, 89, 106, 110, 119; 409/219, 220

[56] References Cited

U.S. PATENT DOCUMENTS

| 1,565,227 | 12/1925 | Garrison | 279/71 |
| 3,342,502 | 9/1967 | Young | 279/81 |
| 3,521,511 | 7/1970 | Deuring et al. | 279/1 ME |
| 3,747,946 | 7/1973 | Edens | 279/81 |
| 4,550,922 | 11/1985 | Hall et al. | 279/119 |

FOREIGN PATENT DOCUMENTS 1355807  6/1974  United Kingdom .............. 279/2 R

Primary Examiner—Gil Weidenfeld
Assistant Examiner—Steven C. Bishop
Attorney, Agent, or Firm—Price, Heneveld, Cooper, DeWitt & Litton

[57] ABSTRACT

A system for holding workpieces during machining providing a plate to which the workpiece can be rigidly secured. The plate, on its rear face, has a central frusto-conical boss which seats into a complementary central recess in a support member. The support member has plural, radially reciprocal latch members which engage pockets in the boss. A ring rotatably mounted on and surrounding the support member is operatively connected to the latch members for simultaneously extending and retracting them.

25 Claims, 10 Drawing Figures

SUPPORT FOR A CHUCK

FIELD OF THE INVENTION

This invention relates to machine tools and more particularly to a means of quickly retooling a machine to adapt it from a workpiece of one design to a workpiece of another design and at the same time being able to maintain tolerances within very precise limits.

This invention is an improvement on the chuck support disclosed in U.S. patent application Ser. No. 730 755, entitled "SUPPORT FOR A CHUCK", filed May 3, 1985, now U.S. Pat. No. 4,647,051, which application and this invention are owned by a common assignee.

BACKGROUND OF THE INVENTION

Many systems and tools have been developed for supporting workpieces while they are being machined. These systems and tools have the common objective of holding the workpiece with sufficient accuracy that the machining satisfies the tolerance requirements for the particular part. The closer the tolerances, the greater the necessity for accurate positioning of the workpiece and the greater the necessity that the workpiece be held against deflection resulting from tool pressure. One approach to this problem has been the use of a jig on which the part is mounted. A jig support is provided at the tool to hold and locate the jig with respect to the tool. In many cases the jig with the workpiece secured to it is moved from machine to machine so that various machining operations can be performed on the workpiece. In many cases the jigs are expensive and their usefulness is limited to a part of a single design and size. Once the production run of the workpiece is finished, the jig has no further utility and is scrap. An example of this type of jig is disclosed in U.S. Pat. 2,176,089 issued Oct. 17, 1939 to F. J. Malone. The cost of this type of tooling coupled with its one-part utility limits the use of this type of tooling to parts requiring mass production.

An even more costly and specialized approach to the problem of holding workpieces for machining is disclosed in U.S. Pat. No. 2,392,169 issued Jan. 1, 1946, to J. H. Mansfield and U.S. Pat. No. 4,309,600 issued Jan. 5, 1982, to C. B. Perry et al. These involve the design of entire systems for multiple machining of parts. To change over systems of this type from one part design to another necessitates a long and costly rebuilding procedure. Thus, the system is useful only for mass produced products having long production runs whereby the cost of the system can be amortized.

Even with the investment in the foregoing systems, the problem of tolerance control remains. The systems are basically incapable of dependably controlling tolerances to less than 0.005 inches.

For the purpose of machining parts when only small quantities are needed, various types of workpiece holders have been developed. An example of this type of workpiece holder is disclosed in U.S. Pat. No. 4,184,669, issued Jan. 22, 1980, to H. Bald. While this type of workpiece holder can be adapted to mount parts of various designs, accurately positioning each workpiece is time consuming and requires both skill and experience. Thus, it is expensive to use. Further, it does not solve the problem of tolerance control.

In many cases, a chuck or collet could be used as the workpiece support. This would significantly improve tolerance control. However, chucks and collets have a very limited range of adjustment for workpieces of different sizes, normally only a few tenths of an inch. Thus, the change over from one part to another involves replacing the chuck or collect to adapt the machine from one workpiece to another. This is a time consuming operation. Further, each time such a change is made the replacement chuck or collet, has to be checked for accuracy of mounting including concentricity with the tool itself. Normally, it also has to be checked for axial position. This is true whether the chuck is mounted for stationary or driven use. The result again is a time consuming and expensive operation. It is also an important cost factor that while the chucks or collets are being exchanged and the replacement checked for accuracy, the machine on which mounting is done is out of production. These machines involve a very substantial capital investment. Therefore, their downtime is costly. This materially adds to the cost of the operation and has a material negative effect upon productivity.

BRIEF DESCRIPTION OF THE INVENTION

The invention provides a means and system to provide quick adaptation or changeover of a machine tool from one machining requirement to another. Further, the invention not only does not sacrifice accuracy to accomplish its purpose, it improves it. This invention is equally effective whether the change involves the size or the type of chuck required. This invention provides a means of rapid interchange with precise control of accuracy not heretofore attained.

The costly machine downtime and labor heretofore necessary for exchanging chucks or collets is eliminated. The invention provides a plate to which a chuck or collet or other workpiece holder is secured either permanently or detachably. The plate is provided with means whereby it can be quickly mounted on or removed from a supporting chuck or a support member having similar characteristics. The plate includes means whereby the operating mechanism of the support chuck can be utilized to open and close the chuck or collet mounted on the plate. The plate and its support chuck are so constructed that the plate will automatically be accurately centered and axially positioned with respect to the support chuck. Thus, the act of gripping the plate with its support chuck automatically positions the plate and the workpiece without the necessity for any adjustments or accuracy checks. All of the accuracy checks and adjustments will have been taken care of at a separate service station or module where the workpiece clamping chuck was initially mounted on the plate. The downtime for the tool itself will be only that necessary to mount the plate on the support chuck. Further, the invention is such that the change from one chuck to another can be accomplished manually or entirely by a robot.

This invention provides a support plate construction of materially reduced weight and bulk without sacrifice of any of the functional advantages of the plate described in U.S. patent application Ser. No. 730,755. It provides a positive lock and release mechanism for the plate which is compact and compatible with total automation of the system.

DESCRIPTION OF THE PREFERRED EMBODIMENT

Figure 1:
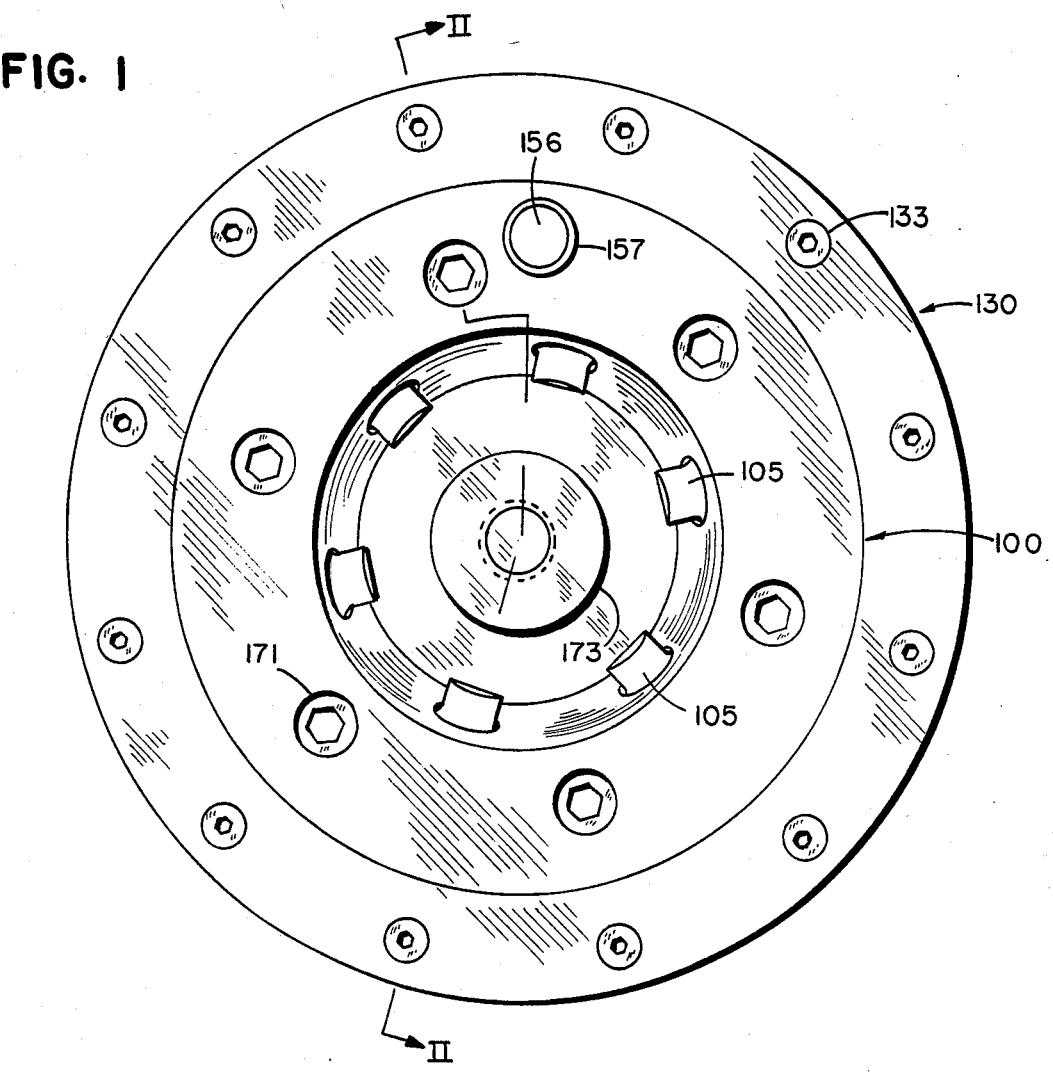
FIG. 1 is a front view of a support chuck.

The numeral 100 refers to a support member designed to be mounted on a suitable support, as for example, a conventional machine tool spindle. The support member is relatively thin axially and performs the functions of a chuck and, thus, throughout the following description is referred to as a support chuck. The support chuck has a body 101 having a frusto-conical recess 102 in its front face 111 located concentrically of the central axis of the chuck and spindle. The front face 111 is normal to the central axis of the support chuck. The body has a plurality of radially extending openings 103 communicating with the recess 102 through its side wall. The openings 103 are equally spaced and extended through the body 101 and open through a recess in its radially outer face. Slidably mounted in each of the openings 103 is a latch assembly 104 the inner end of which has a latch finger 105. The outer end of the latch finger 105 has a blind central opening 106 which receives the inner end of the plunger portion 107 of the latch assembly 104. The plunger has a head 108 on its outer end. The radially outer portion of each of the openings 103 has a counterbore to receive the spring 110 which urges the plunger outwardly.

Figure 3:
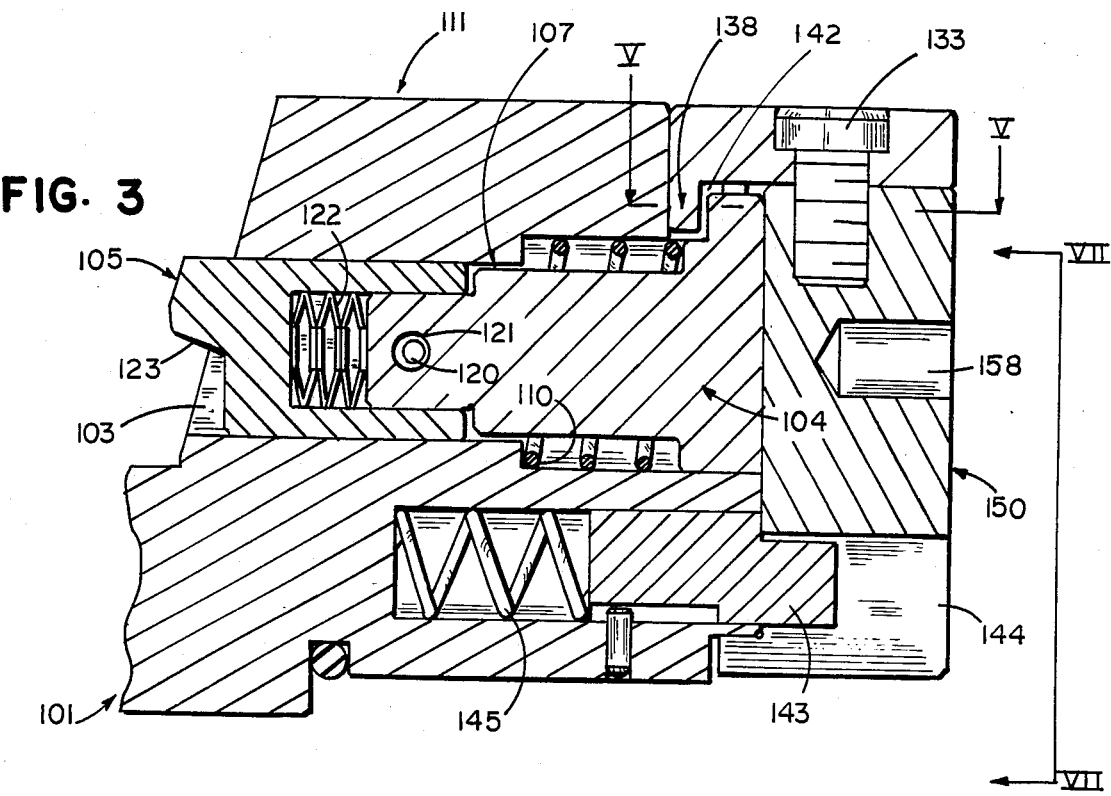
FIG. 3 is an enlarged fragmentary sectional view of one of the locks for the work holder chuck shown in extended position.
Figure 4:
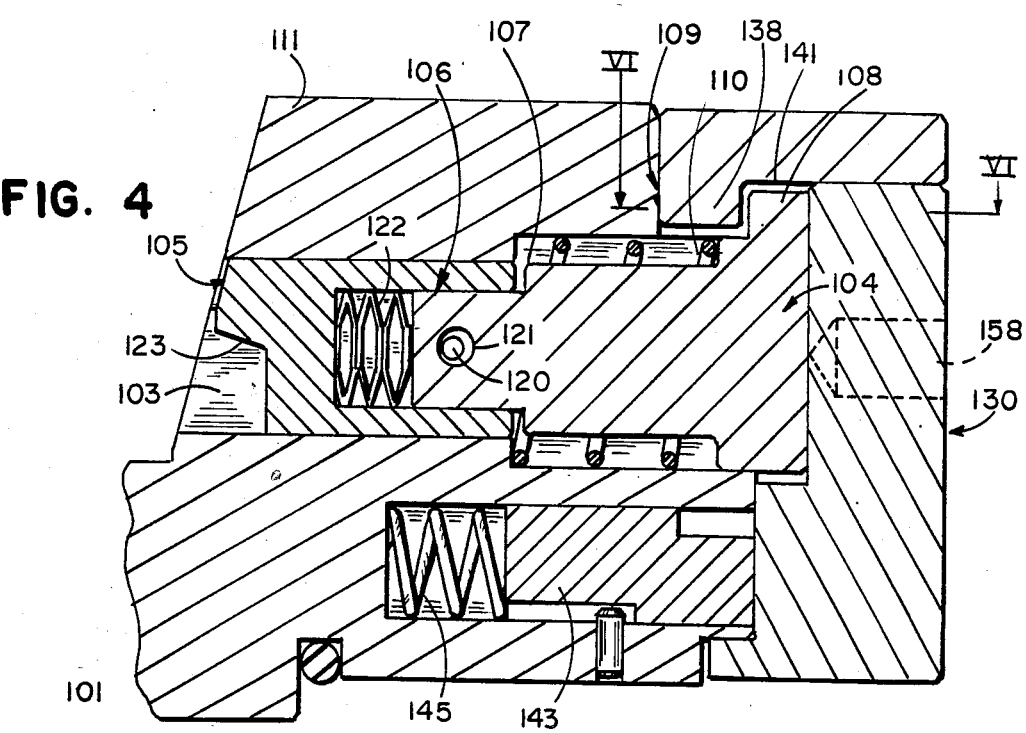
FIG. 4 is a view similar to FIG. 3 illustrating the lock in retracted position.

The latch finger 105 and the plunger 107 are connected by a pin 120 which passes through an enlarged opening 121 in the plunger, permitting a limited amount of lost motion between the finger and plunger. Within the blind opening 106 a column of Bellville washers 122 normally urge the latch finger and plunger apart to the limit permitted by the pin 120 seated in the opening 121 (FIGS. 3 and 4). The inner end of the latch finger has a rearwardly facing cam surface 123.

Figure 2:
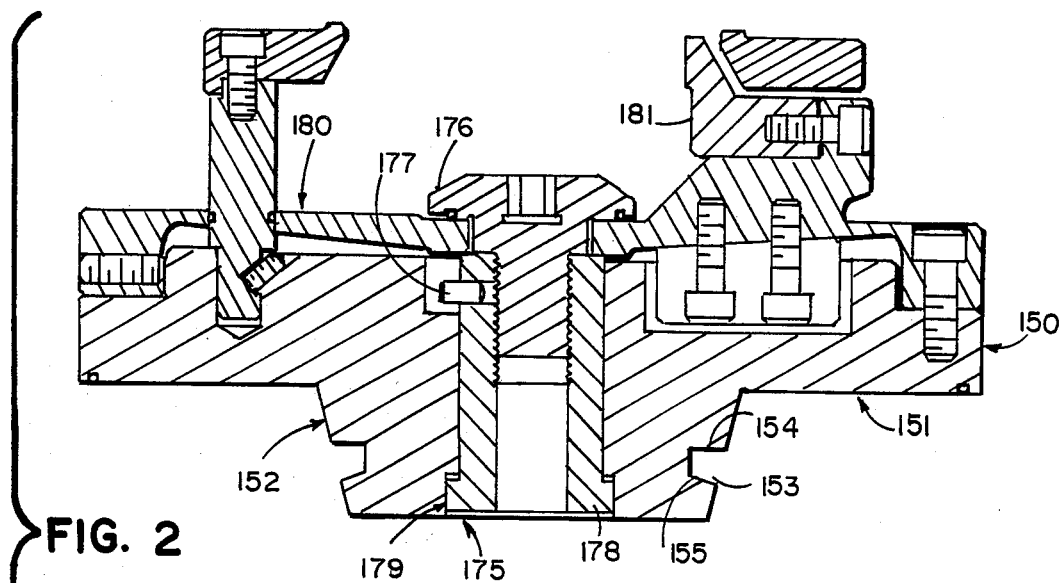
FIG. 2 is a sectional view taken along the plane II—II of FIG. 1 showing both the support and work holder chucks with the chuck illustrated as separated.
Figure 2:
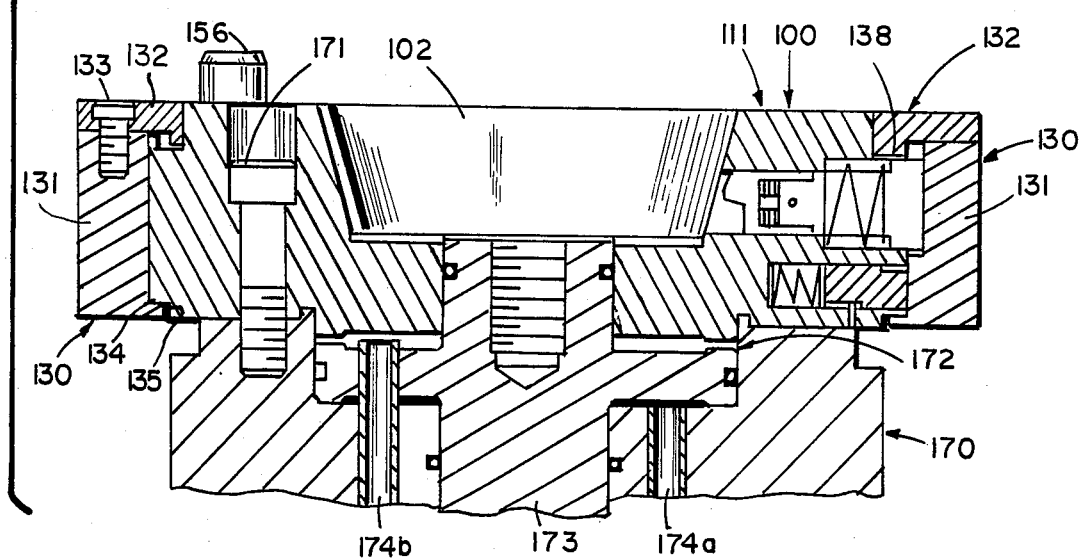

Surrounding the support chuck body and seated in the circumferential recess in the locking ring 130. The locking ring 130 has an annular primary cam member 131 and an annular secondary cam member 132 connected by cap screws 133. The rear face of the primary cam member 131 has retainer flange 134 which seats in the channel 135 formed in the rear outer corner of the body 101 (FIG. 2).

Figure 5:
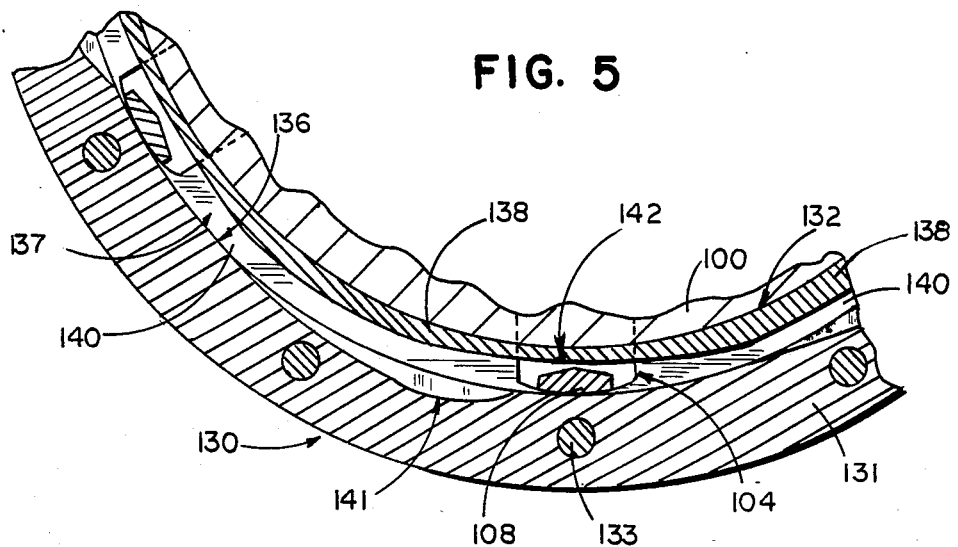
FIG. 5 is a fragmentary sectional view taken along the plane V—V of FIG. 3.
Figure 6:
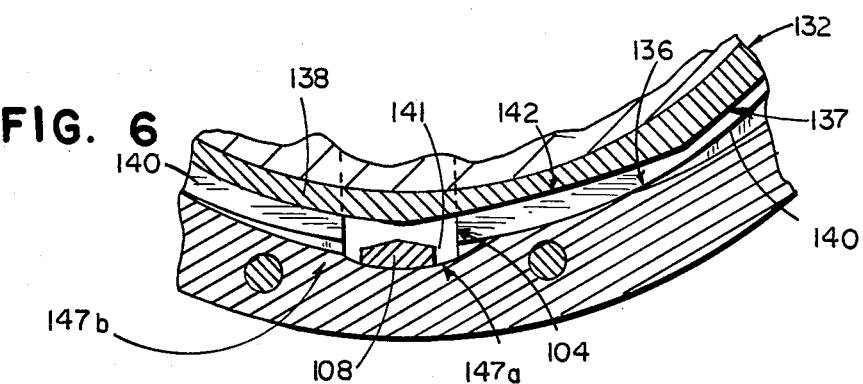
FIG. 6 is a fragmentary sectional view taken along the plane, VI—VI of FIG. 4.
Figure 10:
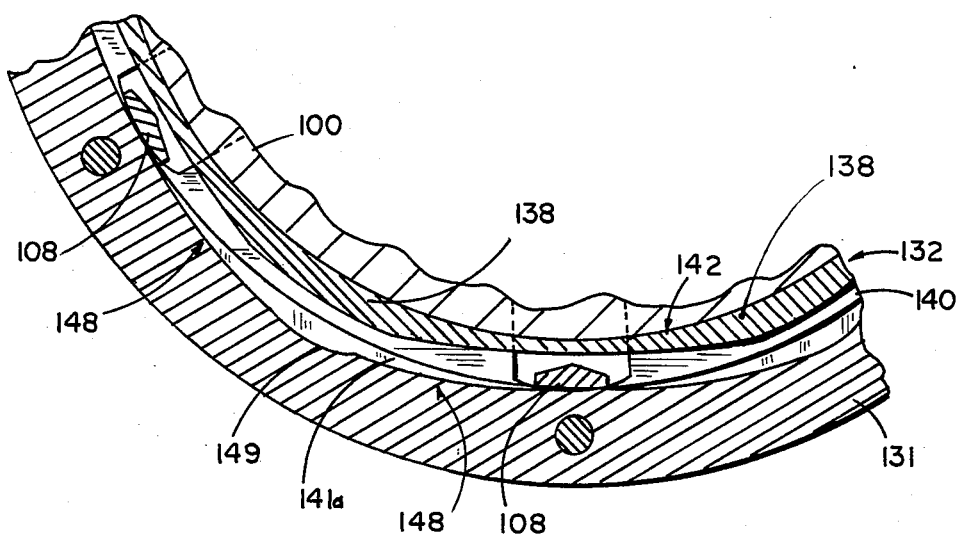
FIG. 10 is a fragmentary sectional view similar to FIG. 5 illustrating a modified construction for the actuator channel of the locking ring.

The inner face 136 of the primary cam member 131 cooperates with the outer face 137 of inner lip 138 of the secondary cam member 132 to create an actuator channel or cam track 140 between them (FIGS. 5 and 6).

The channel 140 is shaped to separately advance and retract each of the latch assemblies 104. Thus, at each latch assembly the channel 140 has a shallow radially outwardly recessed concave pocket 141 which permits the head 108 of the plunger 107 to shift radially outwardly (FIG. 6). There is a separate pocket for each latch assembly 104 and, thus, the pockets 141 are so spaced that they simultaneously align with all of the latch assemblies when the locking ring 130 is rotated. The heads of the plungers will automatically shift outwardly into the pockets because of the bias of the springs 110. The pockets are formed with smoothly curved walls in both directions of rotation of the locking ring forming camming surfaces so that the movement of the heads of the plungers in and out of the pockets is gradual rather than abrupt, thus, reducing as much as possible the amount of force necessary to shift the plungers, particularly when they are being urged inwardly. However, the slope of the end wall 147a of the pocket 141 is substantially steeper or more abrupt than the other end wall 147b. This enables the bottom of the pocket 141 to act somewhat in the nature of a detent to seat the plunger head 108 at the fully retracted position (FIG. 6).

Figure 7:
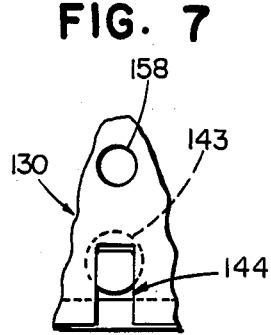
FIG. 7 is a fragmentary elevation view taken along the plane VII—VII of FIG. 3

For the purpose of permitting the inward radial shift of the plungers, adjacent each of the pockets 141 the lip 138 has a shallow recess 142. Each recess 142 combined with the inwardly curving wall 147b forming one end of the adjacent pocket 141 gives the centerline of the channel 140 a somewhat sinuous path which positively forces the plungers inward. Since this movement results from the inner face of the primary cam member 131 bearing against the head 108 of the plunger, this inward movement of the plunger is positive and when completed the plunger is positively locked against any inadvertent outward radial movement, as is clearly evident in FIG. 5. When the locking ring 130 reaches this position, the catch 143 enters a slot 144 in the locking ring under the urging of the spring 145 (FIGS. 3, 4 and 7). As the locking ring is turned counterclockwise, as illustrated in FIGS. 5 and 6, the sloped end walls of the recess 142 positively pull the plungers outwardly as the locking ring is turned. This shifts the ring and latch assemblies toward release position. This camming action is enough to positively initiate retraction of the locking fingers from the plate, thus, preventing hang up of any of the locking fingers due to frictional engagement with the plate. Once this retraction has been initiated, the springs 110 take over and complete the retraction movement as the plunger head 108 drops into the pocket 141.

The cam track or channel 140 is provided with as many pocket combinations 141 and 142 as the body member has latch assemblies 104. In the illustrated construction with six latch assemblies the pocket combinations are at 60° spacings. In like manner, the ring is provided with six slots 144 spaced at 60° intervals. Thus, by intermittently continuing to rotate the ring 130 counterclockwise, each combination of pockets 141 and 142 will move from one latch assembly to another. At each position of the ring where the plunger heads 108 are in the position illustrated in FIG. 5, one of the slots 144 will align with the catch 143, permitting it to automatically stop further rotation of the ring.

The arrangement of the cam track or channel 140 illustrated in FIGS. 5 and 6 is designed for rotation of the ring 130 in one direction only because of the slope of wall 142a. If, however, it is desired to limit ring movement to reciprocal movement, the arrangement illustrated in FIG. 21 can be used. In this arrangement the walls 148 of the pocket 141a are identical, both having a gradual slope. The center of the pocket is formed by a shallow depression or detent 149 to seat the plunger head 108. With this arrangement applied to the support chuck construction illustrated in FIG. 1, the arc of movement of the ring can be limited to 30°.

The support chuck 100 which has been described is designed to mount the plate 150 on which various types of workpiece gripping means can be mounted. For example the plate can be used to mount a diaphragm chuck 180 as illustrated in FIG. 2 or it can be used to mount a collet or other type of workpiece holding means. The particular type of workpiece holding device mounted on the plate is not part of this invention. The construction and operation of the workpiece holding device or chuck mounted on the plate is conventional and well-known to those skilled in the design and use of chucks, collets and fixtures for supporting a part for machining.

Figure 8:
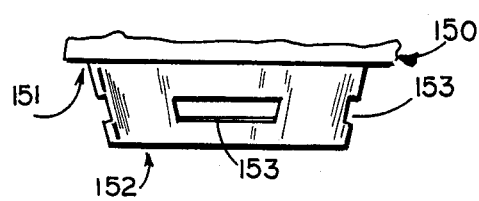
FIG. 8 is a reduced fragmentary side view of the central boss of the plate.

The plate 150 has a flat back face 151 normal to the axis of the plate and adapted to seat against the front face 111 of the support chuck 100. It also has a central frusto-conical central boss 152 of a size and shape to seat snugly within the recess 102. The tapered walls of the boss 152 are designed to seat against the walls of the recess 102 and center the plate 150 with respect to the central axis of the support chuck 100. Cut into the walls of the boss are a plurality of sockets or circumferential slots 153, one aligned with each of the latch assemblies 104 (FIG. 8). These are made by machining cuts in the wall, the central axis of which are parallel to a line tangent with the face of the wall. Each of these slots has an axially forward face 154, normal to the central axis of the plate and an axially rearward face 155 which is inclined outwardly and rearwardly. The inclination of the rearward face is complementary to that on the latch finger 105 which will enter the slot. The slots are all located in a plane normal to the central axis of the plate and parallel to its rear face 151 (FIG. 8). Instead of the individual slots 153, an annular groove or channel of the same cross section could be cut into the face of the boss.

When a particular part is to be machined, the plate 150 having the proper size and type of work holder mounted on its face is selected. The type of work holder is governed by the type of part and the particular machining to be done on it. To mount the plate on the support chuck 100, the locking ring 130 is rotated to a release position permitting all of the latch assemblies 104 to retract. The plate is then mounted on the support chuck using the locator pin 156 on the support chuck (FIG. 2) which is designed to seat in a suitable opening 157 (FIG. 1) in the plate to properly index the plate circumferentially. Then, by means of a suitable tool engaging the opening 158 (FIG. 4), of which there may be as many as there are of the latch assemblies, the locking ring 130 is rotated to extend the latch assemblies 104, forcibly pressing the latch fingers 105 into the slots 153. The engagement of the complementary camming surfaces 123 and 155 causes the plate 150 to be pulled tightly against the front face 111 of the support chuck 100. At the same time, the interfit of the inclined walls of the boss 152 with the complementarily inclined walls of the recess 102 automatically center the plate with respect to the support chuck.

Due to the fact there may be slight differences in the axial position of the slots 153 from one plate to another, or slight differences in the engagement of the camming surfaces 123 and 155 due to wear or because it is impossible to eliminate all possible tolerance accumulation, slight differences in the distance to which the individual latch fingers can be extended will occur. Thus, it is necessary to provide a very small amount of lost motion in the latch assemblies which permits each separate latch assembly to adjust to its own individual situation. This is accomplished by providing a column of Bellville washers 122 in each latch assembly. Since the amount of adjustment is small, these washers are capable of making the necessary compensation. In addition, they have the important advantage of providing uniform rather than graduated resistance as they are compressed, thus, maintaining uniform clamping pressure entirely around the plate. Bellville washers are also important because they can be so designed that they have very high compression resistance, even though they are comparatively small and compact. This is important because these washers must be able to resist the very high centrifugal forces created by the latch fingers at the higher operating speeds of the chuck as, for example, speeds in the range of 5000 r.p.m. or more. Conventional coil springs are incapable of developing this resistance in sizes which can be mounted within the sockets in the latch fingers. In this situation increasing the size of the fingers to obtain more space for the spring is self defeating because this merely adds to the centrifugal forces which will be generated.

The support chuck 100 can be mounted on any appropriate support, stationary or driven. In FIG. 2 it is illustrated as mounted on a machine tool spindle 170 by means of the cap screws 171. The spindle is only fragmentarily illustrated because it is of conventional construction. Further, it can be of a number of different constructions, all of which are well-known to those skilled in the machine tool art. In the case of the spindle 170, the face has a recess 172 forming a chamber within which is seated a piston 173. The piston can be caused to shift forwardly by introduction of pressurized fluid through the conduit 174a. When so shifted, the forward end of the piston engages the spool 175 in the plate 150, pushing it forward. The forward end of the spool engages the center of the diaphragm of the diaphragm chuck 180. This causes the article gripping arms 181 of the chuck to separate, releasing the workpiece. When the fluid pressure behind the piston 173 is released, the resilience of the diaphragm both returns the arms to clamping position and pushes the spool 175 and the piston 173 back to retracted position. The piston can be forcibly retracted by admission of pressurized fluid in front of the piston through the conduit 174b.

A cap 176 is threaded into the forward end of the spool 175 and positively traps the diaphragm between it and the spool. A pin 177 is mounted in the forward end of the spool to prevent spool rotation when the cap is mounted and removed. The rear end of the spool 175 has a flange 178 seated in the recess 179 to limit forward movement of the spool. The piston and spool provide an actuator mechanism for the workpiece chuck so it can be manipulated to grip or release the workpieces.

The above described construction for the workpiece mounting chuck 180 and the actuator mechanism for it is particularly advantageous because it makes the support chuck and the plate each self contained, that is, they can be assembled to and disassembled from each other without any connections having to be made in the actuator system for the workpiece chuck.

Figure 9:
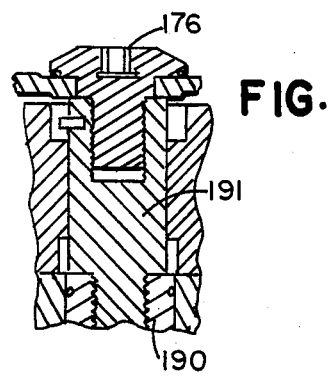
FIG. 9 is a reduced central section view of a modified actuator system for the work holding chuck.

However, various other types of chuck actuator mechanisms operating through the spindle can be substituted for that which has been described. For example, a draw bar 190 extending through the spindle, the support chuck and into the center of the plate could be substituted for the fluid operated mechanism above described. For example, a fitting 191 could be substituted for the spool and threadedly mounted on the forward end of the draw bar and itself be internally threaded to receive the cap 176 (FIG. 9). In this case, the end of the bar could substitute for the flange 178 to limit forward motion. Again, the mounting and dismounting of the plate is quite simple because the only requirement added to that of the arrangement illustrated in FIG. 2 is attachment or removal of the threaded cap. This type of arrangement could be used with a collet in which the central bar for operating the collet is attached to fitting 191 and substituted for the cap 176. It will also be recognized that the actuator mechanism can be used with workpiece gripping chucks of both the O.D. and I.D. gripping types.

This construction of the plate 150 and the means by which it is located with respect to and latched to the support chuck 100 permits both the plate and the support chuck to be simplified and reduced in size. Both units can be substantially reduced in thickness, thus, locating the part or workpiece closer to the spindle of the machine tool or other type of machine tool support, driven or stationary, with which the invention is used. This is important because it reduces the moment arm by which lateral thrust forces imposed on the workpiece by the tools are multiplied. These forces not only accelerate wear on the spindle and spindle bearings, they also increase the effect of any tolerances which exist in the spindle support. The invention both simplifies the support chuck and reduces the mass and weight of the plate. This is not only beneficial during actual machining operations, it facilitates both handling and storage. The mounting and removal of the plates is simplified, significantly contributing to the adaptability of this invention to automation and compatibility with robots.

The invention provides a quick, simple and positive means for mounting the workpiece holding chuck which means will automatically, positively and accurately locate the part to be machined. Also, the time and labor necessary to change the machine from workpieces of one design to workpieces of another design is reduced to a few minutes, as contrasted with hours in other systems.

Having described the invention, it will be recognized that various modifications of it can be made without departing from the principle of the invention. Such modifications are to be considered as included in the hereinafter appended claims unless the language thereof expressly states otherwise.

I claim:

1. Means for mounting an article gripping means on a machine tool support, and aligning it with the central axis of said support said means including an annular plate for supporting the gripping means, said plate having a flat rear surface surrounding a rearwardly projecting frusto-conical boss concentric with the central axis of said plate, radially outwardly facing socket means recessed into the side face of said boss; said means also including a circular body member having in its front face a frusto-conical recess concentric with the central axis of said body member and of a size and shape complementary to that of said boss for seating said boss with the radially facing walls of said recess and boss in contact with each other; a plurality of equally spaced latch elements mounted in said body member for radial movement between extended and retracted positions; said latch elements being axially aligned with said socket, means said elements in retracted position being withdrawn from said socket means and in extended position being seated in said socket means latch actuator means on the exterior of said body member connected to all of said elements for simultaneously shifting said elements radially and locking said elements in plate engaging position; means for securing said body member to a machine tool support.

2. The means for mounting an article gripping means on a machine tool support as described in claim 1 wherein said latch actuator means is a ring mounted on and surrounding said body member.

3. Means for mounting an article gripping means on a machine tool support, said means including an annular plate for supporting the gripping means, said plate having a flat rear surface surrounding a rearwardly projecting frusto-conical boss concentric with the central axis of said plate, radially outwardly facing socket means recessed into the side face of said boss; said means also including a circular body member having in its front face a frusto-conical recess concentric with the central axis of said body member and of a size and shape complementary to that of said boss for seating said boss with the radially facing walls of said recess and boss in contact with each other; a plurality of equally spaced latch elements mounted in said body member for radial movement between extended and retracted positions; said latch elements being axially aligned with said socket means, said elements in retracted position being withdrawn from said sockets and in extended position being seated in said sockets; a latch actuator ring on the exterior and surrounding said body member connected to all of said elements for simultaneously shifting said elements radially and locking siad elements in plate engaging position; said latch acutator ring having a channel forming a cam track, said cam track at each of said latch elements having a pair of circumferentially spaced pockets of different radial spacing from the center of the body member, said channel having spaced radially inner and outer walls, each of said latch elements having a head seated in said channel between said walls whereby as said ring is rotated each of said heads is transferred from one pocket to another thereby radially moving said latch elements; means for securing said body member to a machine tool support.

4. The means for mounting an article gripping means on a machine tool support as described in claim 3 wherein said pockets are formed by recesses in said channel walls, said ring having a primary member and an annular secondary member, said secondary member being a cap secured to the top of said primary member; said outer wall being integral with said primary member and said inner wall being integral with said secondary member.

5. Means for mounting an article gripping means on a machine tool support, said means including an annular plate for supporting the gripping means, said plate having a flat rear surface surrounding a rearwardly projecting frusto-conical boss concentric with the central axis of said plate, radially outwardly facing socket means recessed into the side face of said boss; said means also including a circular body member having in its front face a frusto-conical recess concentric with the central axis of said body member and of a size and shape complementary to that of said boss for seating said boss with the radially facing walls of said recess and boss in contact with each other; a plurality of equally spaced latch elements mounted on said body member for radial movement between extended and retracted positions; said latch elements being axially aligned with said socket means, said elements in retracted position being withdrawn from said socket means and in extended position being seated in said socket means; a latch actuator ring on the exterior of and surrounding said body member connected to all of said latch elements for simultaneously shifting said latch elements radially and locking said elements in plate engaging position; each of said latch elements having a radially inner finger portion and a radially outer plunger portion telescopically joined to said finger portion, the telescopic joinder of said finger and plunger including a lost motion connection, resilient means urging said finger and plunger apart; means for securing said body member to a machine tool support.

6. The means for mounting an article gripping means on a machine tool support as described in claim 5 wherein said resilient means is a plurality of Bellville washers.

7. The means for mounting an article gripping means on a machine tool support as described in claim 6 wherein said finger has a blind socket in its radially outer end, the radial inner end of said plunger being received in said socket, said Bellville washers being in said socket.

8. The means for mounting an article gripping means on a machine tool support as described in claim 5 wherein said lost motion connection includes a hole in said finger and and a pin mounted to the inner end of said plunger and seated in said hole, said hole being larger than said pin to permit diametric movement of said pin with respect to said hole.

9. Support means for mounting and aligning an article gripping chuck on a machine tool support, said means including a circular plate having a flat rear surface surrounding a rearwardly projecting frusto-conical boss concentric with the central axis of said plate, recessed socket means in the circumferential side face of said boss; said support means also including a circular body member having a frusto-conical recess concentric with the central axis of said body member and of a size and shape complementary to that of said boss for seating said boss with the radially facing walls of said recess and boss in contact with each other; a plurality of equally spaced latch elements in said body member and arranged in a radial pattern for radial movement between extended and retracted positions, said latch elements in retracted position being withdrawn from said socket means and in extended position being seated in said socket means; an annular actuator mounted on and surrounding said body member for intermittent movement and operatively connected to all of said latch elements for simultaneously shifting said latch elements radially and locking said latch elements in extended plate engaging position; said actuator having internal walls defining a channel between them, each of said latch elements having a head portion seated in said channel, said channel at each of said latch elements having circumferentially spaced portions at different radial distances from the center of said body member whereby said latch elements are each positively moved radially inwardly and outwardly as said actuator is intermittently rotated a segment of the circumference of said body member; said body member being mountable to the spindle of a machine tool support.

10. The means for mounting an article gripping chuck on a machine tool support as described in claim 9 wherein a plurality of springs are mounted in the body one surrounding each of said latch elements and urging said latch elements radially outwardly.

11. Chuck support and alignment means adapted to be mounted between an article gripping chuck and a machine tool support, the chuck having article gripping means and an actuator therefor, the tool support having a chuck element actuator means extending therethrough, said chuck support comprising: an annular body having one face adapted to abut the machine tool support and an opposite face adapted to seat the chuck; means for securing said body to the machine tool support with the central axis of the body concentric with the axis of the machine tool support; the open center of said body providing a passage for the chuck element actuator means of the machine tool support to engage and manipulate the actuator for the article gripping means of the chuck; said body having a surface inclined to and concentric with its central axis for seating a complementary surface of a chuck for effecting radial alignment, and latching elements for rigidly locking a chuck against said opposite face and said inclined surface; means on the exterior of said body moveable with respect thereto and engaging said latching elements for shifting said latching elements between chuck securing and release positions.

12. Attachment means for mounting and automatically axially aligning an article gripping chuck having actuator elements on a machine tool support, said attachment means comprising: an annular body having one face adapted to abut the machine tool support and an opposite face adapted to seat the chuck; means for securing said body to the machine tool support with the central axis of the body concentric with the axis of the machine tool support; the open center of said body providing a passage for an actuator means of the machine tool support to engage the actuator elements of the chuck; said body having a surface inclined to and concentric with its central axis for receiving the complementary surface of a chuck for effecting radial alignment, chuck engaging latching elements for rigidly seating a chuck against said opposite face and the inclined surface; latch manipulation means on the exterior of said body movable with respect thereto and engaging said latching elements for shifting said latching elements between chuck securing and release positions, the central opening in said body providing a passage through which chuck actuator means can be mounted.

13. The chuck support and alignment means as described in claim 12 wherein said inclined surface is the peripheral wall of a recess and said complementary surface is the radially outwardly facing walls of a frusto-conical boss.

14. The chuck support and alignment means as described in claim 11 wherein said latching elements are mounted for radial movement and said complementary surface has element receiving recess means therein.

15. The chuck support and alignment means as described in claim 12 wherein said latch manipulation means is a ring surrounding said body having an inwardly facing circular cam track characterized by alternately positioned portions of greater and lesser radius whereby rotation of said ring in either direction through an arc of limited length will cause said latching elements to shift between securing and release positions.

16. Attachment means for mounting and automatically axially and radially aligning an article gripping chuck on a machine tool support having a chuck actuator element, a chuck supporting member; said chuck including its gripping fingers and actuator means therefor being mounted on said supporting member, said attachment having an annular body; said member and said body having interengaging radially acting first locator means for positioning said member concentrically of said body and axially engaging second locator means for positioning said member axially of said body; clamp means mounted on said body for radial reciprocal movement between chuck clamping and chuck release positions; clamp actuator means mounted on the exterior of said body and engaging said clamp means, said clamp actuator means being movable with respect to said body for alternately shifting said clamp means between clamping and release positions; a central opening for the chuck actuator element of the machine tool support extending centrally through both said body and member whereby it will have access to the gripping finger actuator means.

17. Attachment means as described in claim 16 wherein the gripping finger actuator means of the chuck is mounted on said supporting member and includes means for operatively connecting it to the chuck actuator element extending through said opening.

18. Attachment means as described in claim 17 wherein said attachment means is rigidly secured to the machine tool support in concentric relationship thereto.

19. Attachment means as described in claim 16 wherein said clamp actuator means is circumferentially movable with respect to said body.

20. Attachment means as described in claim 19 wherein said clamp actuator means is an annulus having means on its inner face engaging said clamping means for shifting them between clamping and retracted positions.

21. Attachment means as described in claim 16 wherein said clamping means are a plurality of equally spaced radially moveable latch pins mounted for sliding movement in said body, the radially outer ends of said clamping means engaging said clamp actuator means.

22. Attachments means as described in claim 21 wherein said supporting member has openings therein for receiving the ends of said pins when said pins are in extended clamping position; said pins and openings having complementary axially inclined surfaces for urging said supporting member axially against said body.

23. Attachment means as described in claim 21 wherein each pin has a spring member urging it into retracted position and engagement with said clamp actuator means.

24. Attachment means described in claim 23 wherein said clamp actuator means is an annulus having means on its inner face engaging said clamp means for shifting them between clamping and retracted positions.

25. Attachment means as described in claim 22 wherein each of said pins have separate radially outer and inner portions, a lost motion connection between said portions to accommodate tolerance accumulation limiting the radially inner movement of the inner portion.

* * * * *